United States Patent
Hamaguchi

Patent Number: 6,138,217
Date of Patent: Oct. 24, 2000

[54] METHOD AND APPARATUS FOR CACHE COHERENCY IN AN INTERCONNECTING NETWORK

[75] Inventor: Kazumasa Hamaguchi, Yokohama, Japan

[73] Assignee: Canon Kabushiki Kaisha, Tokyo, Japan

[21] Appl. No.: 08/976,236

[22] Filed: Nov. 21, 1997

[30] Foreign Application Priority Data

Nov. 25, 1996 [JP] Japan .................................. 8-313490

[51] Int. Cl.⁷ .................................................. G06F 12/12
[52] U.S. Cl. .......................... 711/141; 711/142; 711/143; 711/144; 711/145; 711/146
[58] Field of Search ..................... 711/141, 142, 711/143, 144, 145, 146

[56] References Cited

U.S. PATENT DOCUMENTS

| | | | |
|---|---|---|---|
| 5,386,546 | 1/1995 | Hamaguchi | 711/133 |
| 5,553,310 | 9/1996 | Taylor et al. | 710/40 |
| 5,577,218 | 11/1996 | Hamaguchi | 711/5 |
| 5,623,628 | 4/1997 | Brayton et al. | 711/141 |
| 5,680,576 | 10/1997 | Laudon | 711/145 |
| 5,696,936 | 12/1997 | Church et al. | 711/138 |
| 5,737,568 | 4/1998 | Hamaguchi et al. | 711/121 |
| 5,802,578 | 9/1998 | Lovett | 711/147 |
| 5,829,032 | 10/1998 | Komuro et al. | 711/141 |
| 5,860,110 | 1/1999 | Fukui et al. | 711/141 |
| 5,893,149 | 4/1999 | Hagersten et al. | 711/135 |
| 5,900,020 | 5/1999 | Safranek et al. | 711/167 |
| 5,923,339 | 7/1999 | Date et al. | 345/505 |
| 5,933,261 | 8/1999 | Fukui et al. | 395/125 |
| 5,937,431 | 8/1999 | Kong et al. | 711/145 |

OTHER PUBLICATIONS

Tanenbaum, Andrew, "Structured Computer Organization", Prentice–Hall, Inc. New Jersey. 1984. pp. 10–12.

*Primary Examiner*—Do Hyun Yoo
*Assistant Examiner*—Than Nguyen
*Attorney, Agent, or Firm*—Fitzpatrick, Cella, Harper & Scinto

[57] ABSTRACT

In a data processing system where a plurality of nodes, each having a plurality of processors and cache memories associated with each of the processors, are connected via a bus, tag information is added to each data block stored in the cache memories. The tag information has state information which includes information (INTERNODE-SHARED) indicative of whether or not the data block is cached in another node. When a write-access is transmitted to the data block in the cache memory, if the state information added to the data block is INTERNODE-SHARED, invalidation of the data block is requested to the other node.

24 Claims, 9 Drawing Sheets

METHOD AND APPARATUS FOR CACHE COHERENCY IN AN INTERCONNECTING NETWORK

BACKGROUND OF THE INVENTION

The present invention relates to a data processing system preferable for managing a copy status of a data block stored in a cache memory and maintaining coherency of the data block status, and the apparatus and control method thereof.

In a computer system, a processor includes a cache memory in many cases in order to quickly respond to an access request made by a processor to access a memory device, and to reduce communication traffic in an interconnecting network. The processor sequentially loads a copy of codes and data having a fixed size (hereinafter generically referred to a "data block") from the memory device in a cache memory associated with the processor, and processing is proceeded by utilizing the copy.

In a case where a parallel computer system includes a plurality of cache memories, it is necessary to maintain coherency of the data block. Generally, the status of each copied data block in the cache memory is monitored, and upon receiving an access request, operation/action is performed in correspondence with the copied status of the data block, whereby maintaining the coherency. One of the protocols for managing the status of each data block is the MESI protocol.

According to the MESI protocol, the status in which a data block can be copied is classified into the following four states:

M: MODIFIED (EXCLUSIVE_DIRTY STATE:
   an exclusive state where the subject data block is not shared with another cache memory, and contents thereof are different from that of the original data block);

E: EXCLUSIVE (EXCLUSIVE_CLEAN STATE:
   an exclusive state where the subject data block is not shared with another cache memory, and contents thereof coincide with that of the original data block);

S: SHARED (SHARED_CLEAN STATE:
   a shared state where the subject data block is shared with a plurality of cache memories, and contents thereof coincide with that of the original data block); and

I: INVALID (INVALID STATE).

For instance, in a case where a data block in the S (shared) state is write-hit (hereinafter, the state at which a write-access hits a data block cached in a cache memory will be referred to as "write-hit"), copies of the subject data block existing in other cache memories are invalidated and writing is executed. As a result, the subject data is transferred from the S state to the M state. In a case where a read-access to a copy of the data block in the M state is issued in an interconnecting network, operation, e.g. executing the access service, is performed by utilizing the copy of the subject data block, whereby maintaining the coherency of the data block.

A cluster-type parallel computer system is available as a method of constructing a parallel computer system. In the cluster-type parallel computer system, a plurality of nodes are interconnected via a second network. In each node, more than one processors, a cache memory associated with each of the processors, a memory and the like are interconnected via a first network. The cluster-type parallel computer system often adopts a memory form called a distributed shared memory. This is a form where a part or all of the memory device in each node is regarded logically as one main memory of the entire system. More specifically, a processor in an arbitrary node is able to directly access a data block in a memory device of an arbitrary node, and also each cache memory associated with a processor of an arbitrary node is able to store a copy of a data block in a memory device of an arbitrary node.

In the system such as the cluster-type parallel computer system having the second network where cache memories are not directly connected, in other words, in the system where a cache memory controller is unable to monitor all transactions taking place in the interconnecting network, the coherency in the cache is generally maintained by the directory based method. According to this method, a memory medium (or content) called a directory is provided to store and manage caching information for each memory block having a fixed size, and in a case where a transaction which requires coherency-maintain operation is issued, the transaction is notified to a cache memory which is caching the subject memory block. Accordingly, coherency in the cache is maintained.

In a case of a cache memory in the cluster-type parallel computer system, a copy of a stored data block may be classified also into an exclusive state or a shared state. However, the copy status of the data block in the cluster-type parallel computer system is different from the conventional status. More specifically, the SHARED state is further classified into the following:

a state where the subject data block is shared with another cache memory in the same node;

a state where the subject data block is shared with a cache memory in another node; and a state where the subject data block is shared with another cache memory in the same node as well as with a cache memory in another node.

As described above, the shared state is finely classified in the cluster-type parallel computer system, and the cost required for maintaining coherency is different in each state. Therefore, adopting the general cache memory management mechanism may result in decline in system capability.

For instance, in a case where a cache memory adopting a general method is used, the above-described three types of shared states are managed as one SHARED state.

Herein, the following operation is performed when a write-access is issued and the write-access hits a copy of a data block in the SHARED state:

(1) issue a data-invalidation transaction in the first network;

(2) transfer the data-invalidation transaction to a node which has a directory entry corresponding to the data block subjected to the transaction;

(3) check the directory entry and transfer the data-invalidation transaction to a node which is caching the copy of the subject data block;

(4) with respect to each node, issue the data-invalidation transaction to the first network;

(5) return acknowledgment, indicative of completion of the data-invalidation transaction, to a node having the subject directory entry;

(6) notify completion of the data-invalidation transaction to the node which has issued the data-invalidation transaction, upon receiving all acknowledgment; and (7) notify completion of the data-invalidation transaction to the cache memory which has issued the data-invalidation transaction, resulting in termination of the data-invalidation transaction.

The foregoing steps are the required processing in a case where a data block is in the shared state with a cache memory in another node. However, in a case where the data block is shared with a cache memory in the same node, only the following two steps are required.

(1) issue a data-invalidation transaction to the first network; and (2) terminate the data-invalidation transaction.

As set forth above, if the general cache memory is used in the cluster-type computer system, unnecessary processes are generated, resulting in decline in the system capability.

SUMMARY OF THE INVENTION

The present invention has been made in consideration of the above situation, and has as its object to provide a data processing system consisting of a plurality of nodes connected via a bus, to which cache memories are not directly connected, for reducing the amount of processing necessary for maintaining coherency of data status cached in cache memories of the system, and to provide the apparatus and control method thereof.

Another object of the present invention is to reduce an amount of communication between nodes at the time of performing operation to maintain coherency in cache memories, thus realizing efficient coherency-maintenance operation.

Another object of the present invention is to eliminate an unnecessary access when invalidating cache data.

Another object of the present invention is to realize efficient cache maintenance processing by properly combining the snooping method and directory based method.

In order to attain at least one of the aforementioned objects, according to an embodiment of the present invention, the present invention provides a data processing system where a plurality of nodes are connected via a network, each node having a plurality of processors and respective cache memories associated with each of the processors, comprising: adding means for adding attribute information to each data block stored in the cache memories to indicate whether or not the data block is cached in another node; first maintenance means for, in a case where an access requiring cache maintenance is issued to a cached data block, executing cache maintenance with respect to cache data in a node issuing the access; and second maintenance means for, in a case where attribute information of the data block subjected to the access indicates that the data block is cached in another node, executing cache maintenance with respect to cache data in said another node.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENT

Preferred embodiment of the present invention will be described in detail in accordance with the accompanying drawings.

Figure 1:
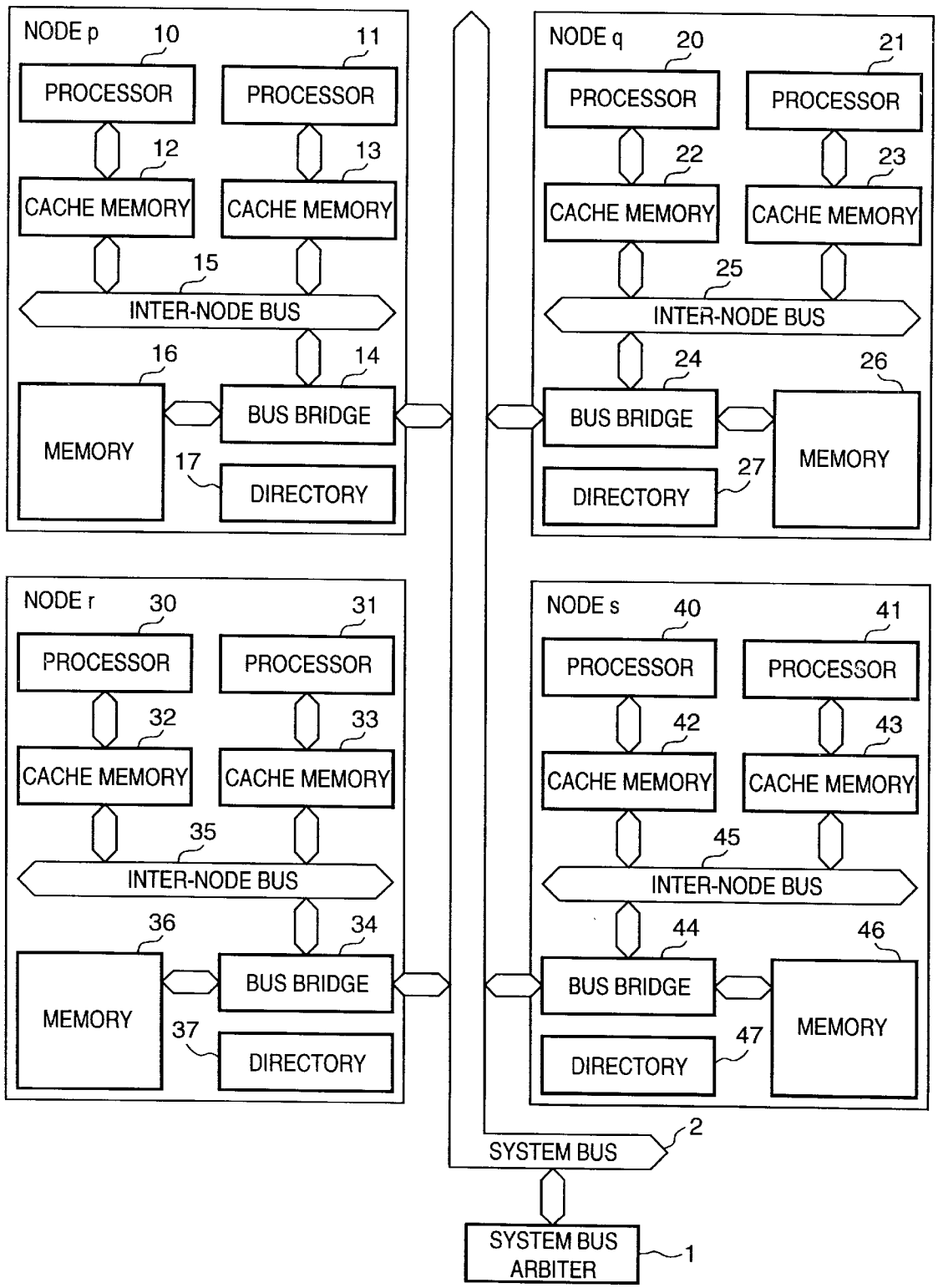
FIG. 1 is a block diagram showing a construction of a data processing system according to the present embodiment.

FIG. 1 is a block diagram showing a construction of the data processing system according to the present embodiment. Reference numeral 1 denotes a system bus arbiter which arbitrates timing of various signals in a system bus 2. Reference numeral 2 denotes a system bus. Node p, node q, node r and node s have the same configuration. The data processing system according to the present embodiment is a cluster-type parallel computer system where the node p, node q, node r and node s are interconnected via the system bus 2. Note that the present invention is not limited to the aforementioned construction of this system.

In the node p, reference numerals 10 and 11 are processors each of which is connected to cache memories 12 and 13 respectively. Cache memories 12 and 13 are interconnected with a bus bridge 14 via an inter-node bus 15. The bus bridge 14 serves as a bridge between the inter-node bus 15 and the system bus 2. The bus bridge 14 not only controls arbitration in the inter-node bus 15 and controls a memory device 16, but also holds and manages caching information by using a directory 17 to keep coherency in the cache. Similarly, in the nodes q, r and s, reference numerals 20, 21, 30, 31, 40 and 41 denote processors; 22, 23, 32, 33, 42 and 43 denote cache memories; 24, 34, and 44 denote bus bridges; 25, 35 and 45 denote inter-node buses; 26, 36 and 46 denote memory devices; and 27, 37 and 47 denote directories.

Figure 2:
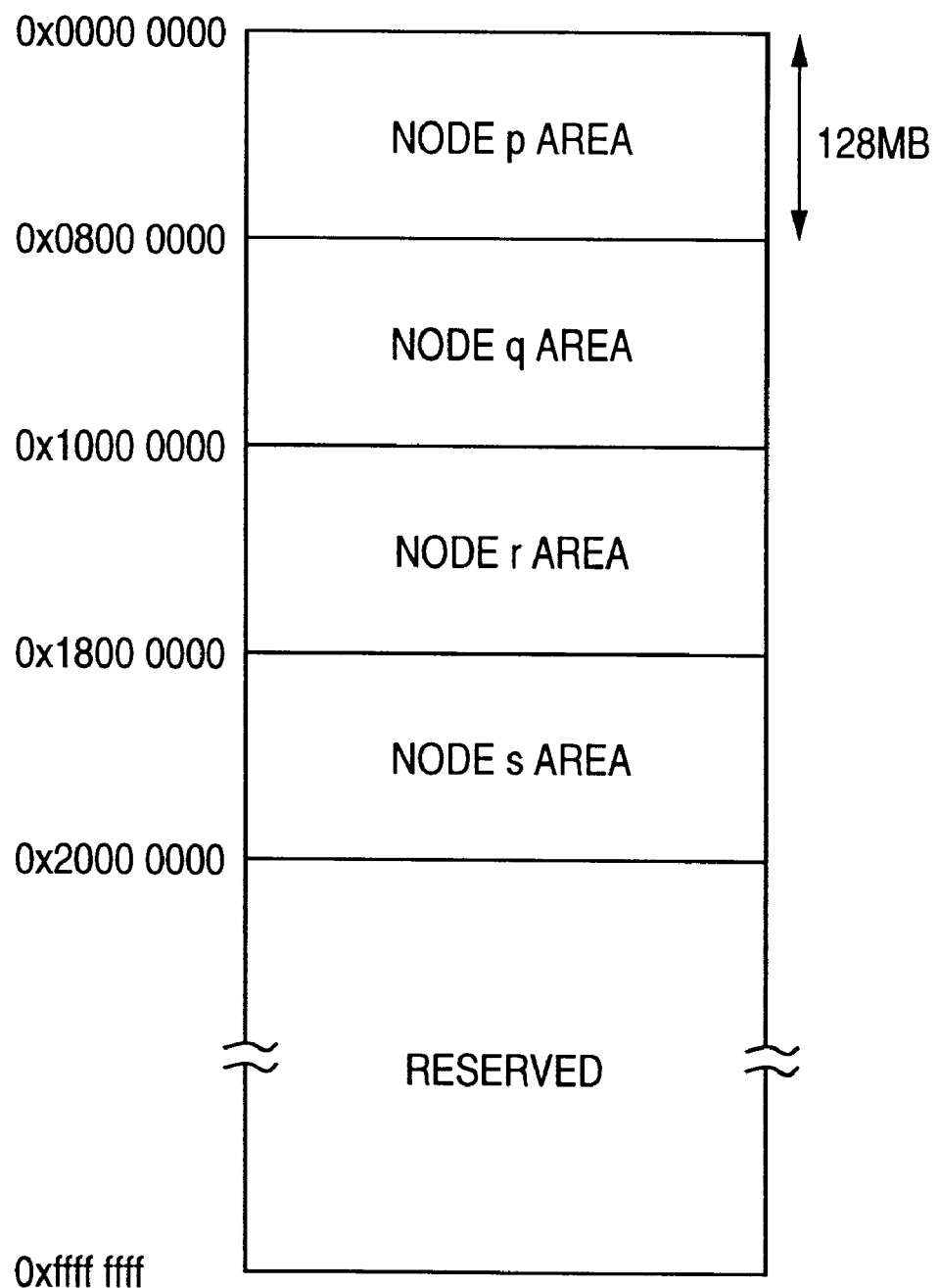
FIG. 2 is a conceptualized diagram describing allocation of a memory space to each node of the data processing system according to the present embodiment.

FIG. 2 is a conceptualized diagram describing allocation of a memory space to each node of the data processing system according to the present embodiment. As shown in FIG. 2, from 0x00000000 to 0x07ffffff is allocated to the memory device 16 in the node p; from 0x08000000 to 0x0fffffff, to the memory device 26 in the node q; from 0x10000000 to 0x17ffffff, to the memory device 36 in the node r; and 0x18000000 to 0x1fffffff, to the memory device 46 in the node s, each node having 128 MB. From 0x20000000 to 0xffffffff is a reserved area. Note that the present invention is not limited to this address map.

Figure 3:
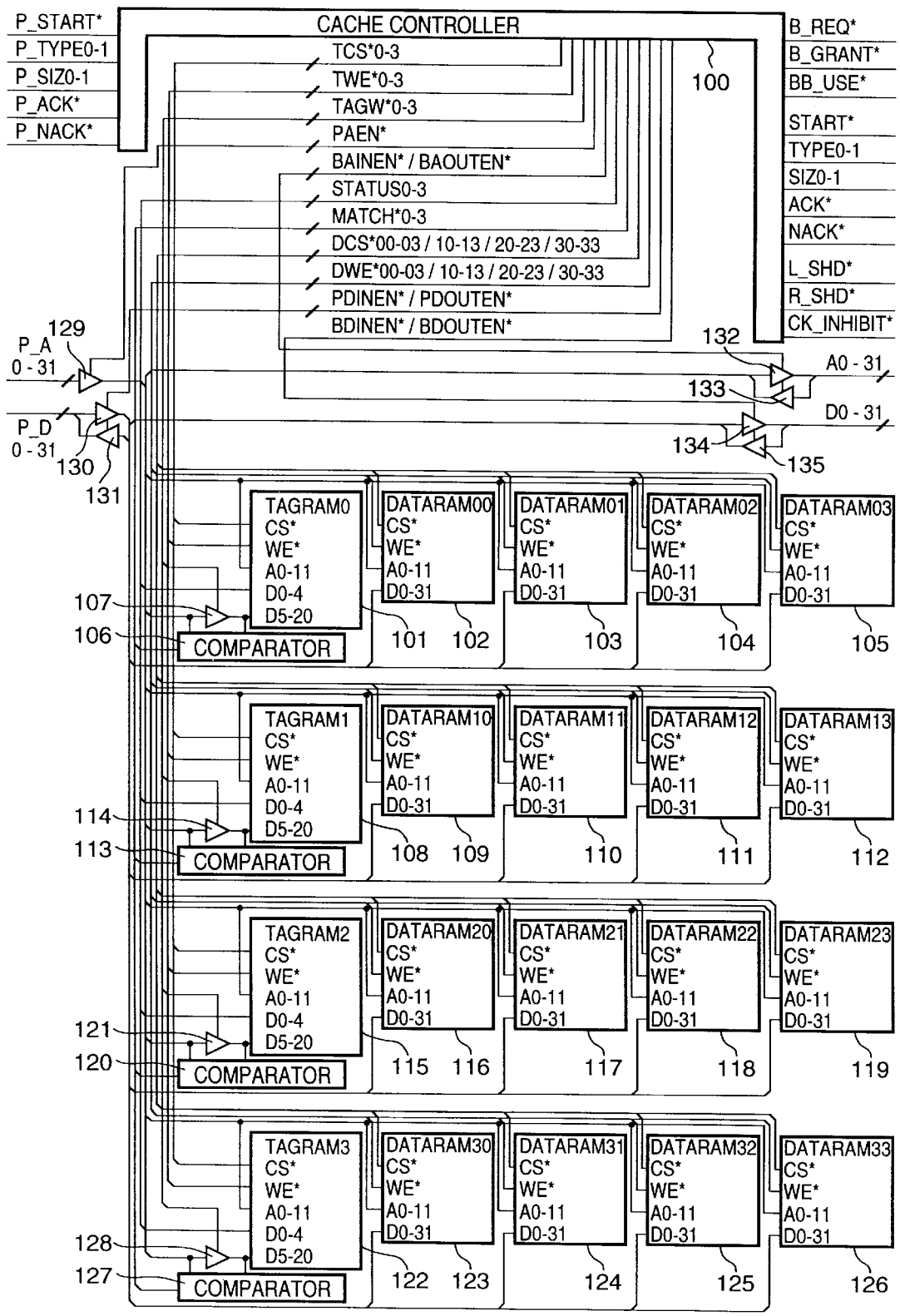
FIG. 3 is a block diagram showing a construction of a cache memory in the data processing system according to the present embodiment.

FIG. 3 is a block diagram showing a construction of the cache memories (12, 13, 22, 32, 33, 42 and 43) in the system according to the present embodiment. The memory shown in FIG. 3 is a cache memory adopting 4-way set associative scheme, having a capacity of 256K byte, the set number of 4096, and a block size of 16 byte. Note that the present invention is not limited to this construction and size of the cache.

Reference numeral 100 denotes a cache controller connected to control signal lines of the collateral processors (10, 11, 20, 21, 30, 31, 40 and 41) and the inter-node buses (15, 25, 35 and 45). Reference numerals 101, 108, 115 and 122 denote RAM for storing tag data; and 102, 103, 104, 105, 109, 110, 111, 112, 116, 117, 118, 119, 123, 124, 125 and 126, a RAM for storing data. Reference numerals 106, 113, 120 and 127 denote a comparator; and 107, 114, 121, 128, 129, 130, 131, 132, 133, 134 and 135, a buffer which can have three output states.

As shown in FIG. 3, the cache memory is connected to an external unit of the cache memory (processor and inter-node bus) via various signal lines.

Connection with the processor is realized by P_START* indicative of access start, P_TYPE0-1 and P_SIZ0-1 indicative of access attributes e.g., read/write, an access size and the like, P_ACK* and P_NACK* indicative of access-terminate signals, an address signal P_A0-31 and a data signal P_D0-31.

Moreover, connection with the inter-node bus is realized by B_REQ* and B_GRANT* which are a signal for arbitrating the inter-node bus, BB_USE* asserted while the bus bridges (14, 24, 34 and 44) transmit transactions to the inter-node bus (15, 25, 35 and 45), START* indicative of access start, TYPE0-1 and SIZ0-1 indicative of access attributes, ACK* and NACK* indicative of access-terminate signals, an address signal A0-31 and a data signal D0-31. Note that the mark "*" added at the end of the above signals indicates low-true. Furthermore, connection between the cache controller 100 and inter-node bus is realized by L_SHD*, R_SHD* and CK_INHIBIT* which are signal lines unique to the present embodiment.

Signal lines in the cache memory include: TCS*0-3 (the number representing the number of the way) indicative of chip select signals of the tag RAM, TWE*0-3 (the number representing the number of the way) indicative of write enable signals of the tag RAM, TAGW*0-3 (the number representing the number of the way) for controlling the three states of the buffer at the time of writing in the tag RAM, PAEN* for controlling the three states of the buffer of an address signal in the processor side, BAINEN* and BAOUTEN* for controlling the three states of the buffer of an address signal in the inter-node bus side, STATUS0-3 indicative of status information stored in the tag RAM, MATCH*0-3 (the number representing the number of the way) indicative of a result of address comparison at the time of cache accessing, DCS*00-03/10-13/20-23/30-33 (of the number ij, i represents the number of the way and j represents a decimalized value of P_A28-29 or A28-29 (e.g., if the 28-th bit and 29-th bit are 1,0, j would be 2)) indicative of a chip select signal of a data RAM, DWE*00-03/10-13/20-23/30-33 (of the number ij, i represents the number of the way and j represents a decimalized value of P_A28-29 or A28-29) indicative of a write enable signal of the data RAM, PDINEN* and PDOUTEN* for controlling the three states of a data signal in the processor side, and BDINEN* and BDOUTEN* for controlling the three states of a data signal in the inter-node bus side.

Figure 4:
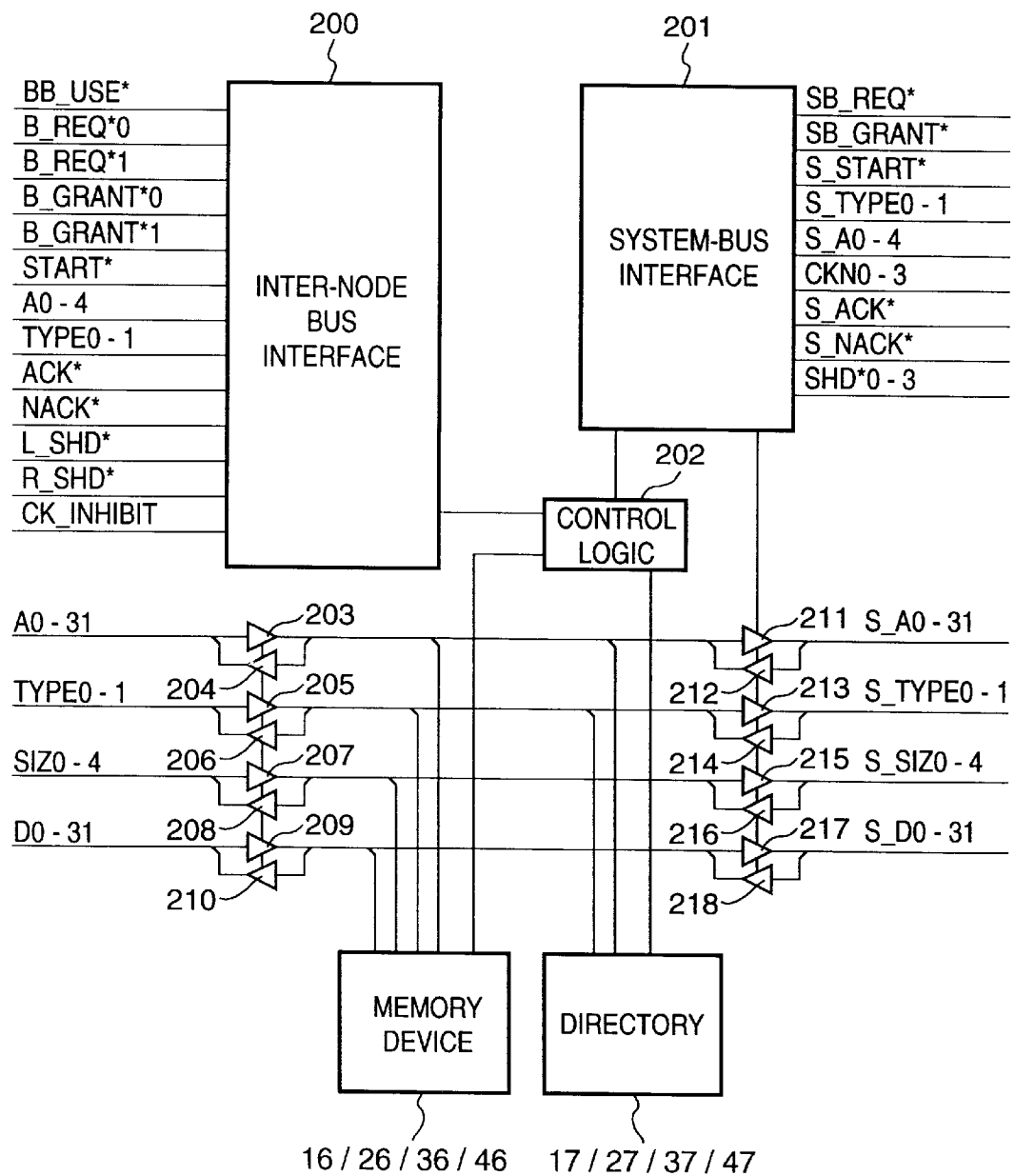
FIG. 4 is a block diagram showing a construction of a bus bridge in the data processing system according to the present embodiment.

FIG. 4 is a block diagram showing a construction of the bus bridge (14, 24, 34 and 44) in the present system. Reference numeral 200 denotes an inter-node bus interface; 201, a system-bus interface; 202, a control logic; 203, 204, 205, 206, 207, 208, 209, 210, 211, 212, 213, 214, 215, 216, 217 and 218, a buffer which can have three output states. The function of the bus bridge having the foregoing construction will be apparent from the following description on the operation.

Hereinafter, operation of the data processing system according to the present embodiment will be described and characteristics thereof will also be explained. Note that although the following description will be given mainly on the node p, the same operation is performed in other nodes in the similar situation described below.

Figure 5:
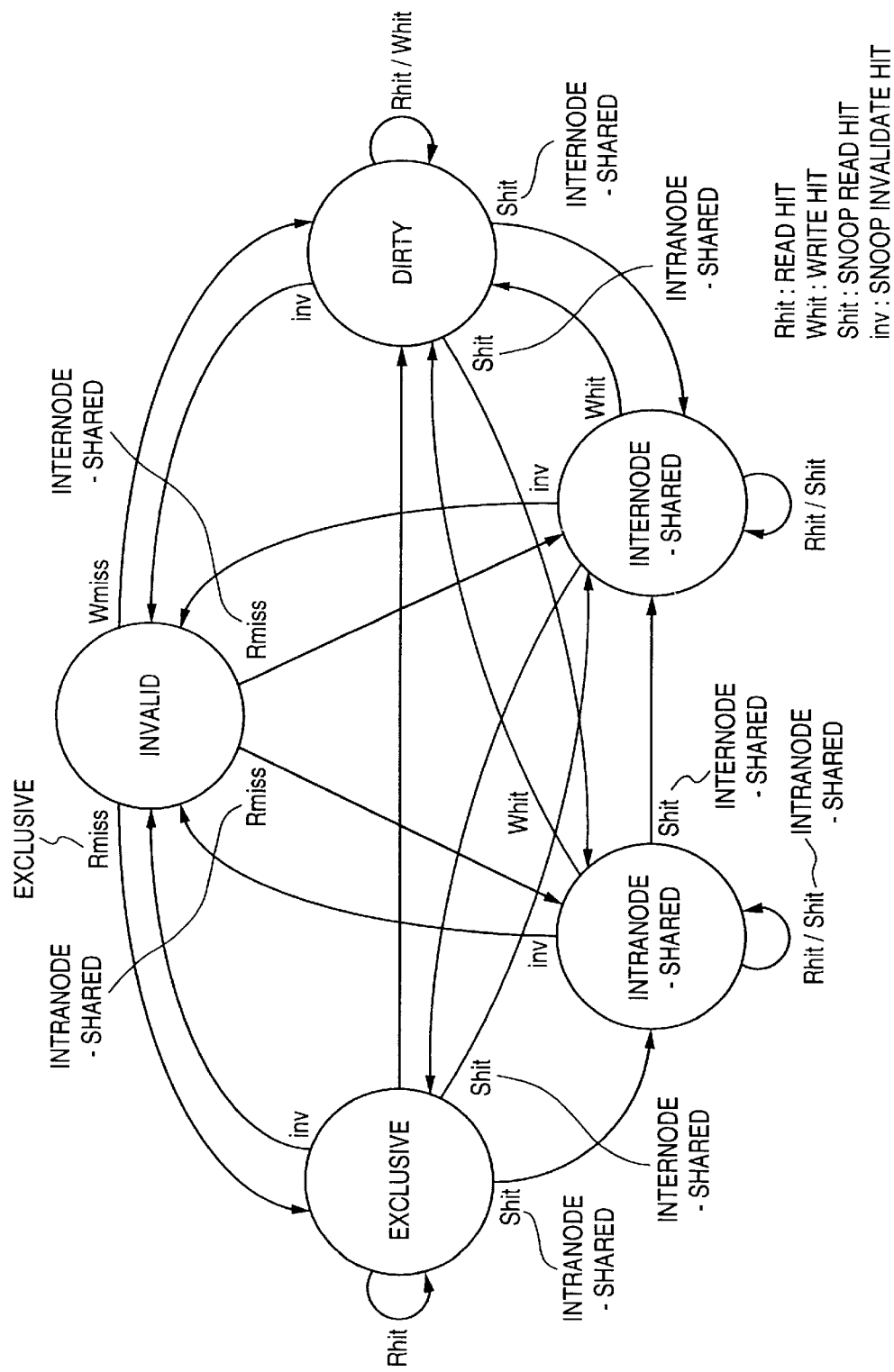
FIG. 5 is an explanatory diagram showing status transfer of a data block in a cache memory according to the present embodiment.

FIG. 5 is an explanatory diagram showing transferring of a data block status in the cache memory according to the present embodiment. In the present system, a copy status of a data block stored in the cache memory is transferred as shown in FIG. 5. A data block may take the following five states:

INVALID (invalid state);

EXCLUSIVE (a state where contents of the subject data block are the same as that of an original data block in a memory device);

DIRTY (a state where contents of the subject data block are different from that of the original data block in the memory device);

INTRANODE-SHARED (a state where the subject data block is shared with another cache memory in the same node, and contents thereof are the same as that of the original data block in the memory device); and INTERNODE-SHARED (a state where the subject data block is shared with a cache memory outside the node, or shared with a cache memory outside the node as well as a cache memory in the same node, and contents thereof are the same as that of the original data block in the memory device).

Figure 6:
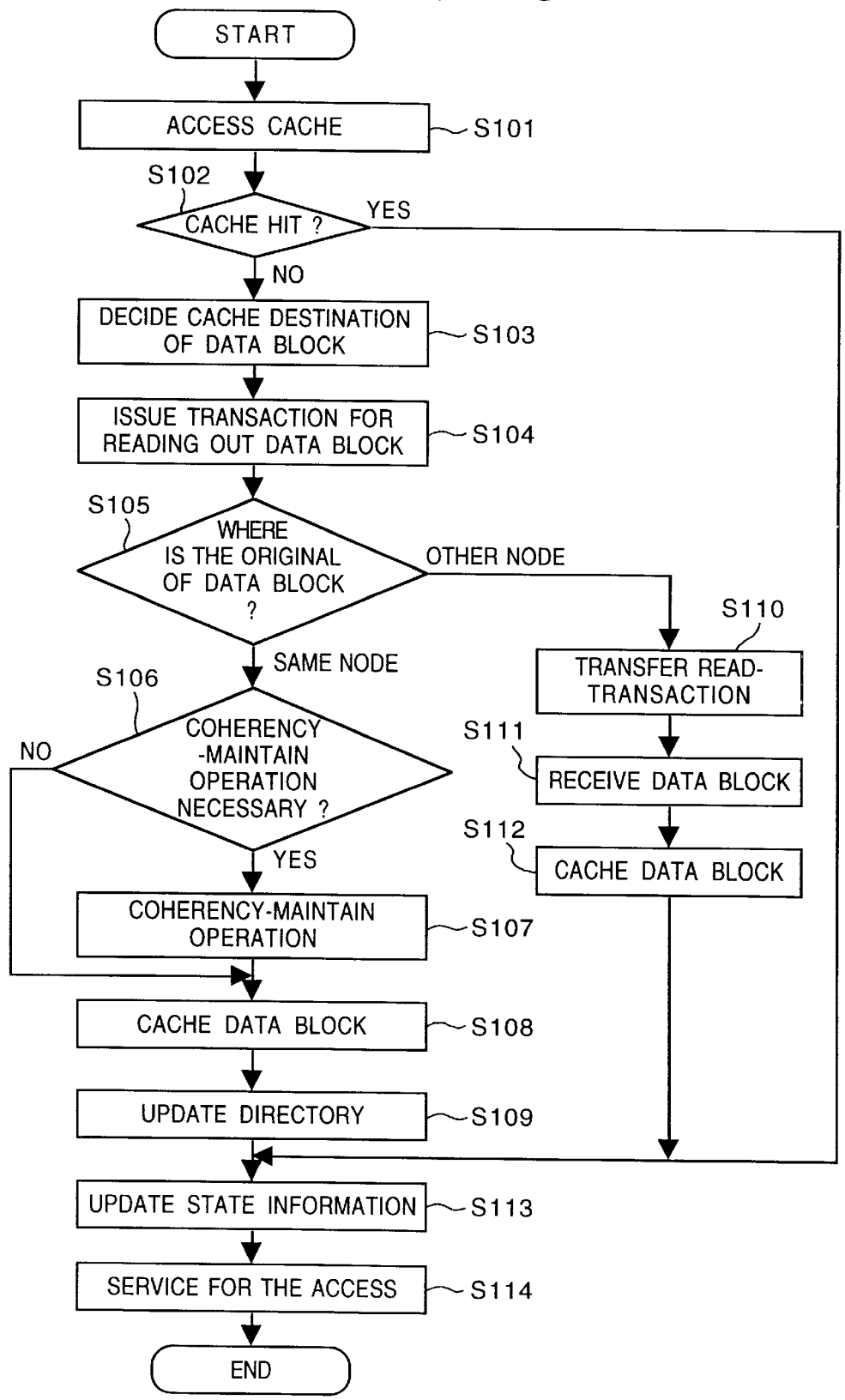
FIG. 6 is a flowchart describing the steps of accessing a cache memory according to the present embodiment.

FIG. 6 is a flowchart describing the steps of accessing a cache memory according to the present embodiment.

First in step S101, accessing a cache memory is performed. For instance, an access command by the processor 10 is issued to the cache memory 12.

Herein, the cache controller 100 in the cache memory 10 detects an issuance of an access command when P_START* is asserted. P_TYPE0-1 indicates whether the access is read or write, and P_SIZ0-1 indicates the access size. The cache controller 100 asserts PAEN* whereby opening the buffer 129, and transfers an access address into the cache memory 12. Then, the cache controller 100 asserts TCS*0-3 to access each tag RAM (101, 108, 115 and 122) for memory-read.

Figure 7:
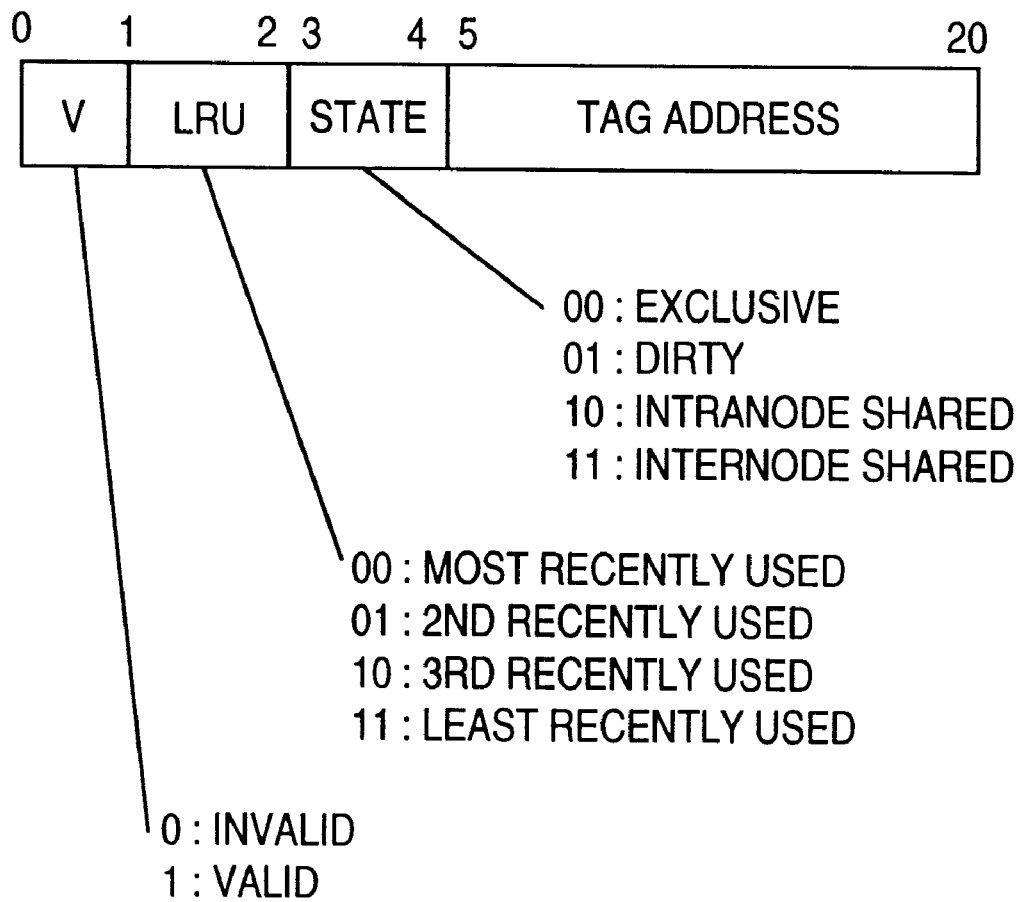
FIG. 7 is a data structure view of tag data.

The tag RAM (101, 108, 115 and 122) holds tag data related to copies of a stored data block as shown in FIG. 7. A tag address portion (bit 5-20) of the tag data, subjected to being accessed, is inputted in the comparator (106, 113, 120 and 127). The result of the comparator (106, 113, 120 and 127) is transmitted to the cache controller 100 by MATCH*0-3. Further, the rest of the data stored in the tag RAM (101, 108, 115 and 122), i.e. V bit (bit 0), LRU data (bit 1-2) and state data (bit 3-4), are transmitted to the cache controller 100 by STATUS0-3.

Herein, if any of the MATCH*0-3 is asserted and the V bit of the STATUS0-3 in the subject set is "1", it is considered as a cache hit; otherwise, it is considered as a cache miss. In the case of a cache hit, necessary operation for maintaining coherency is performed, and the access issued by the processor (10) is serviced (steps S102, S113 and S114 in FIG. 6). Meanwhile, in the case of a cache miss, the processing proceeds from step S102 to step S103 to enter cache miss processing.

The cache miss processing is performed in the following manner. First, a storage destination for storing a new copy of a data block is decided (step S103). Herein, if there are sets where V bit=0, in other words, if there is any empty set, one of the empty sets is selected as a cache destination of the subject data block. If there is no empty set, a set where the LRU value=11 is selected. If the state information of the selected set is "DIRTY", write-back operation is performed to write back in the original data block stored in one of the memory devices 16, 26, 36 or 46, and the set is determined as a cache destination of the data block.

Upon deciding the cache destination, a copy of the data block including the data subjected to be accessed by the processor 10 is read into the cache memory 12. If the access from the processor which has resulted in a cache miss is "read", a read-access is issued, and if the access is "write", a read-access with an invalidate request is issued to the inter-node bus 15 (step S104). This transaction is received by the bus bridge 14. The bus bridge 14 determines whether or not the subject access is an access to a memory device in another node or an access to the memory device in the same node, on the basis of the access address of the transaction. The operation of the bus bridge differs depending on a case where the data block subjected to transaction is in the memory device of the same node or the case where the data block is in the memory device of another node (step S105).

In a case where the data block subjected to transaction is in the memory device of the same node, accessing the directory 17 is first performed by the bus bridge 14. The directory 17 stores respective caching information of data blocks in the memory device of the same node. Thus, by accessing the directory, it is possible to find the node where the copy of the data block subjected to transaction is cached.

If it is determined, based on obtained caching information, that it is necessary to perform coherency-maintain operation, necessary operation is performed, as will be described later (steps S106 and S107), then the processing proceeds to step S108. If it is determined that it is not necessary to perform any coherency-maintain operation, the processing proceeds from step S106 to S108.

In step S108, accessing is first performed to the memory device 16 to read the data block subjected to transaction out of the memory device 16, and the data block is stored in the caching destination decided in step S103. Further in step S109, the entry is updated in the directory.

Meanwhile, in a case where the data block subjected to transaction is in the memory device of another node, the processing proceeds from step S105 to S110. In step S110, the bus bridge 14 transfers, via the system bus 2, the read-transaction issued in step S104 to a bus bridge of the node designated by the address A0-4.

The bus bridge of the node, which has received the read-transaction, accesses the directory, similar to the aforementioned operation in steps S106 to S109, and performs necessary coherency-maintain operation. Then the data block subjected to transaction is read out of the memory device. The entry is updated in the directory. The data block read out of the memory device is sent to the bus bridge 14 of the node which has issued the read-transaction. At this stage, SHD*0-3 indicates information regarding a node where the copy of the subject data block is cached.

Upon receiving the data block subjected to transaction in step S111, the data block is outputted to the inter-node bus 15 according to a bus protocol. At this stage, an L_SHD* signal from the other cache memory 13 indicates whether or not the copy of this data block is stored in the cache memory 13. In other words, L_SHD* shows whether or not the subject data block is stored in another cache memory in the same node. Moreover, an R_SHD* signal from the bus bridge 14 indicates whether or not the copy of the subject data block is stored in a cache memory of another node.

The cache memory 12 receives the data block subjected to transaction, transfers the data to the processor 10 in accordance with the bus protocol and stores the data block in the storage destination which has been determined in advance (step S112). Then in step S113, tag data is written in the tag RAM.

Herein, if the cache miss is caused by a write-access of the processor 10, the state information (bit 3-4 in FIG. 7) is set at 01 to indicate DIRTY state. If the cache miss is caused by a read-access and neither the L_SHD* signal or R_SHD* signal is asserted, more specifically, if a copy of the subject data block does not exist in any other cache memories in the same node or other nodes, the state information is set at 00 to indicate EXCLUSIVE state. If the cache miss is caused by a read-access and only the L_SHD* signal is asserted, in other words, if a copy of the subject data block is stored in another cache memory of the same node but is not stored in a cache memory of other nodes, the state information is set at 10 to indicate INTRANODE_SHARED state. If the R_SHD* signal is asserted, in other words, if a copy of the subject data block is stored also in a cache memory of other nodes, the state information is set at 11 to indicate INTERNODE_SHARED state. Cache error processing operation is performed in the foregoing manner.

Upon completing the foregoing cache miss processing operation, the access request is serviced in step S114. Note that if an access of the processor which has caused cache miss is a write-access, the bus bridge in the node where the original data block of the transaction-subjected data block exists, which has detected the read-access with an invalidate request in the cache miss processing, issues a data-invalidation transaction to all the nodes which cache the data block, similar to the operation which will be described later. Thus, the exclusive state of the data block is assured.

The coherency-maintain operation will now be described. Coherency in the present system is maintained by notifying transaction between nodes based on the directory based method, snooping the transaction in the inter-node bus by the cache controller and changing a copy status of the data block. The changing of a copy status of a data block is shown in FIG. 5. For instance, assume that a subject data block is cached in the cache memory 12 and is in the EXCLUSIVE state. If the processor 11 performs read-transaction with respect to the subject data block and cache the subject data block in the cache memory 13, the read-transaction is snoop-hit by the cache controller of the cache memory 12 and the status of the subject data block in the cache memory 12 is changed from the EXCLUSIVE state to INTRANODE_SHARED state. Meanwhile, if a read-transaction with respect to the same subject data block is issued by the bus bridge 24 and is snoop-hit, the status of the subject data block in the cache memory 12 is transferred to the INTERNODE_SHARED state. Herein, "snoop-hit" indicates the state where a cache controller detects an access with respect to a data block, whose copy is cached in the cache memory controlled by the cache controller, while snooping the inter-node bus.

Figure 8:
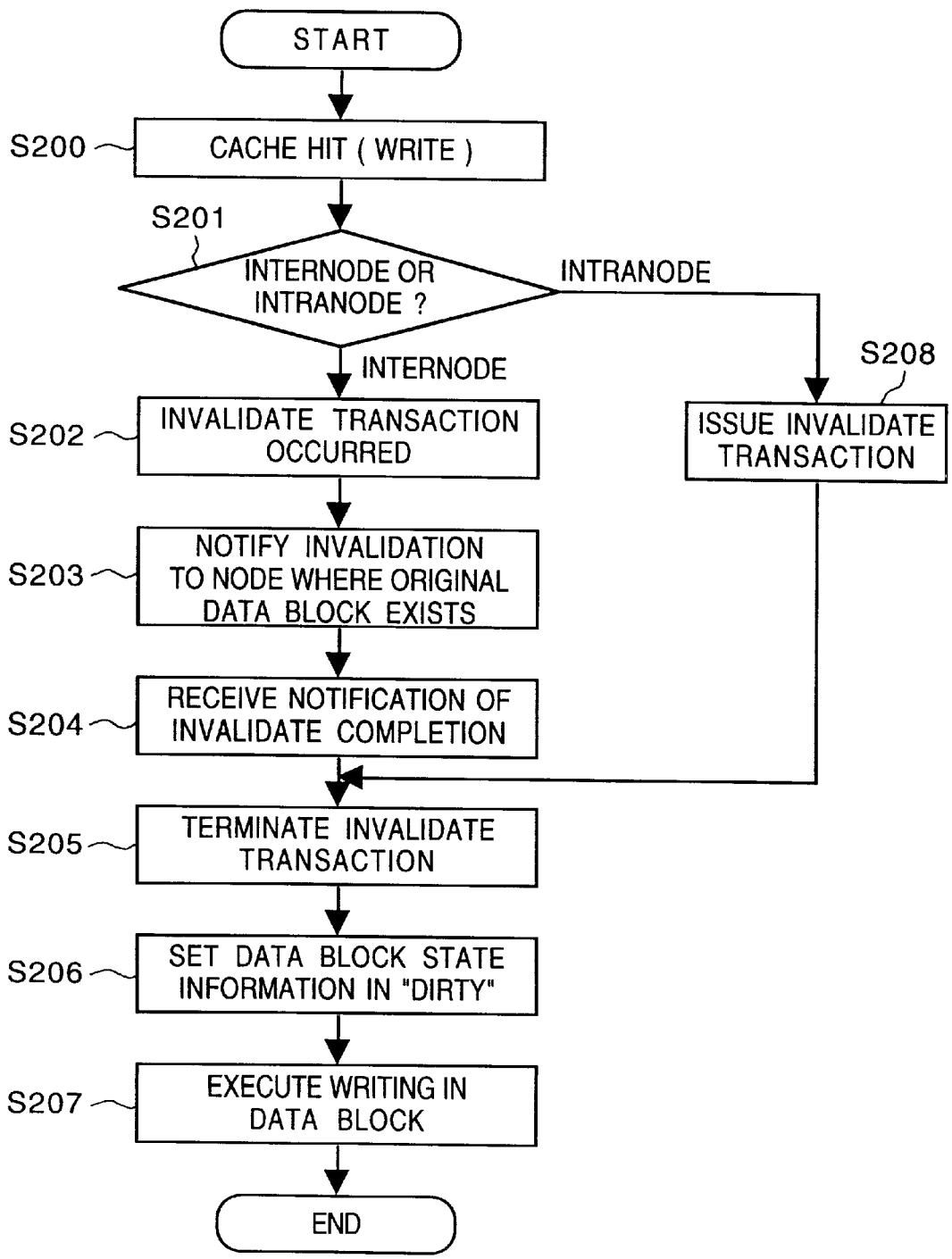
FIG. 8 is a flowchart for explaining operation when cache data is write-hit according to the present embodiment.

One of the characteristics of the system according to the present embodiment is in that the conventional SHARED state is managed by two states: INTERNODE_SHARED state and INTRANODE_SHARED state. Description will be provided below on the operation performed in a case where a data block in the above-mentioned states is write-hit. FIG. 8 is a flowchart describing the operation performed when cache data is write-hit, according to the present embodiment.

When a copy of a data block in the INTERNODE_SHARED state is write-hit, a data-invalidation transaction is issued from the cache memory 12 to the inter-node bus 15 (steps S201 and S202). Upon detecting the data-invalidation transaction, the cache memory in the same node sets the copy status of the subject data block, stored in the cache memory, in "INVALID" for invalidation. Further, the occurrence of the data-invalidation transaction is notified by the bus bridge 14, via the system bus 2, to the node which contains the original of the data block subjected to invalidation, that is, the node which includes a directory entry corresponding to the data block subjected to invalidation (step S203).

Figure 9:
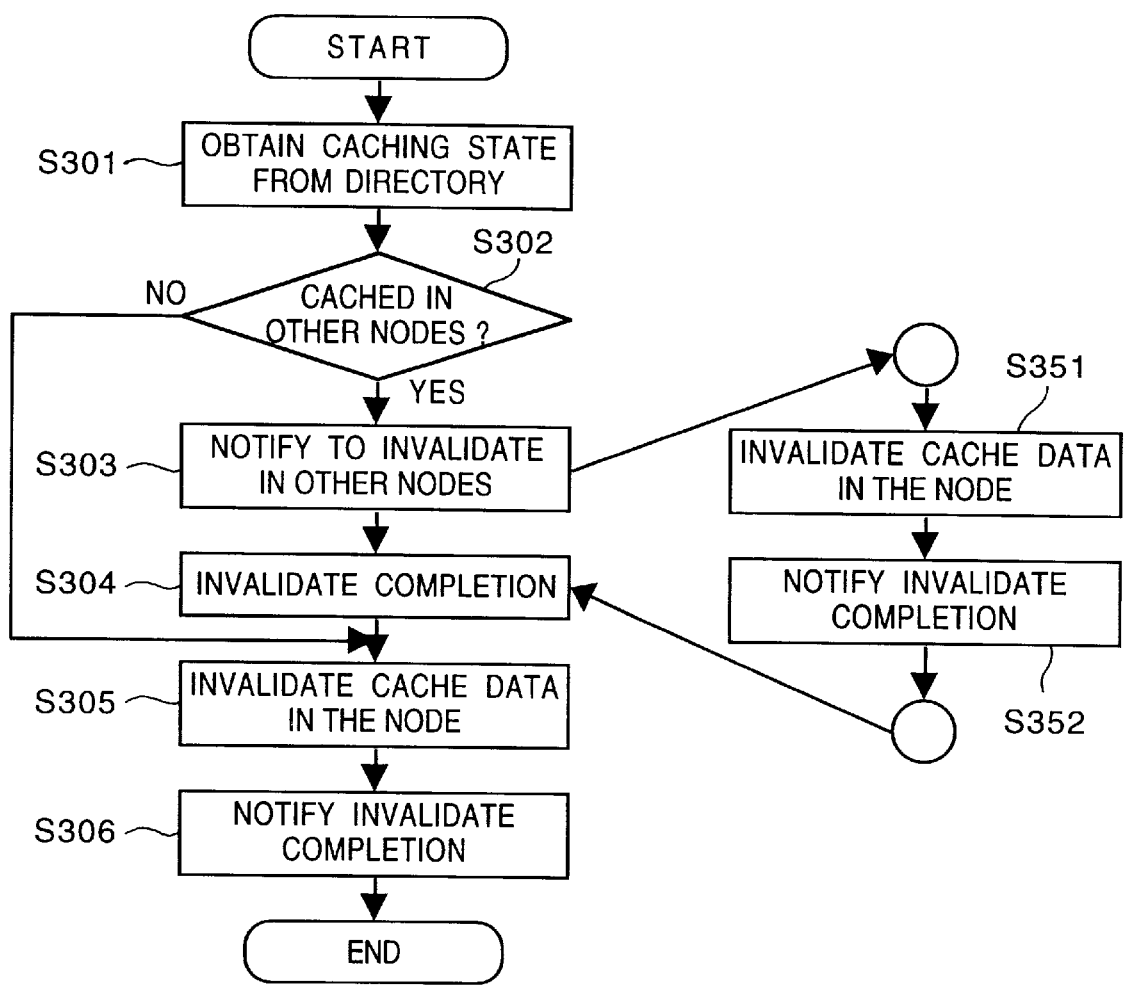
FIG. 9 is a flowchart for explaining the operation steps of a node containing the original of a data block, which has received an invalidate notification from an external unit.

Herein, description will be provided on the operation of the node containing the original of the data block, which has received the invalidate notification. FIG. 9 is a flowchart explaining the operation steps of the node containing the original, which has received the invalidate notification from an external unit.

The bus bridge of the node, which has received the notification, accesses the directory to find a node where a copy of the subject data block is cached (step S301). In a case where the subject data block is cached in other nodes, the bus bridge issues a data-invalidation transaction via the system bus 2 respectively to the nodes which cache the copy of the subject data block (steps S302 and 303).

A bus bridge of the node, which has received the data-invalidation transaction, issues the same data-invalidation transaction to the bus in the node. A cache memory in the node detects the issued data-invalidation transaction, sets the copy status of the stored data block in "INVALID" for invalidation (step S351). Upon completion of the data-invalidation transaction, the bus bridge in the node notifies the node containing the original of the subject data block that invalidation has been completed (step S352).

When the node, containing the original of the subject data block, receives notification, indicative of completion of the invalidation, from all the other nodes which have received the data-invalidation transaction (step S304), the node invalidate the copy of the subject data block in this node (step S305). After the node containing the original of the subject data block receives invalidate-complete notification from all the nodes and invalidate the data block in this node in the foregoing manner, this node notifies to the originating node, which has transmitted the occurrence of the data-invalidation transaction, that the copy of the subject data block has been invalidated (step S306).

Referring back to FIG. 8, the bus bridge 14 of the node, which has received the notification, terminates the data-invalidation transaction in the cache memory 12 in accordance with the bus protocol (steps S204 and S205). Then the cache memory 12 sets the copy status of the subject data block in DIRTY state and continues the process (step S206 and S207).

Meanwhile, when a copy of a data block in the INTRANODE_SHARED state is write-hit, the processing proceeds from step S201 to S208 in FIG. 8. A data-invalidation transaction is issued from the cache memory 12 to the inter-node bus 15 in the similar manner to that at the time where a copy of a data block in the INTERNODE_SHARED state is write-hit. Herein, in the case of the INTRANODE_SHARED state, the cache memory 12 asserts a CK_INHIBIT* signal to notify the bus bridge 14 that it is not necessary to perform coherency-maintenance over the entire network of nodes, as that executed when a copy of the data block in the INTERNODE_SHARED state is write-hit.

The data-invalidation transaction issued from the cache memory 12 to the inter-node bus 15 is detected by the other cache memory 13, which invalidates a copy of the subject data block. Since the CK_INHIBIT* signal is asserted, the bus bridge 14 does not perform coherency-maintain operation. The issued data-invalidation transaction is terminated in accordance with the bus protocol (step S205). Then the cache memory 12 sets the copy status of the subject data block in DIRTY, and continues the process (step S206 and S207).

As has been described above, according to the above-described embodiment of the present invention, it is possible to manage a data block in a shared state, where the data block is stored in plural cache memories in the cluster-type parallel computer system, by distinguishing whether the data block is shared with a cache memory of the same node or is shared with a cache memory of another node. When the coherency-maintain operation of a copy of such data block is necessary, whether or not the coherency-maintenance over the entire network of nodes is necessary, is notified to the bus bridge and the like serving as an interface between nodes. Therefore, the overhead necessary to maintain coherency is reduced, thereby improving system capability.

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

Figure 10:
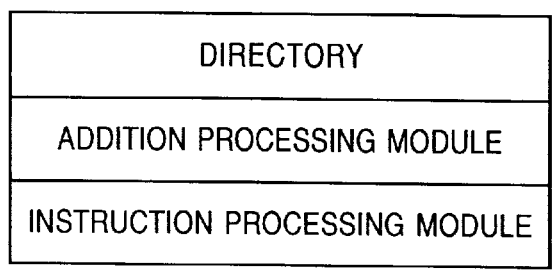
FIG. 10 is an explanatory diagram showing a memory map of a memory medium storing control programs according to the present embodiment.

In a case where the present invention is applied to the aforesaid storage medium, the storage medium stores program codes corresponding to the flowcharts described in the embodiment. Briefly, the storage medium stores each module shown as an example of a memory map in FIG. 10. More specifically, program codes which correspond to the "addition processing module" and "instruction processing module," at least, are to be stored in the storage medium.

Herein, the control programs of the above-described modules include a plurality of processors and cache memories associated with each of the processors, and manage caching in the data processing apparatus which shares the memory space with an external data processing apparatus. The addition processing module realizes addition processing for adding state information to a data block, indicative of whether or not each of data blocks stored in the cache memory is cached in other nodes. The instruction processing module realizes instruction processing, performed when a data block cached in the cache memory is accessed, for giving an instruction to another node based on contents of the access and state information added to the data block.

As has been described above, according to the present invention, in the system where a plurality of nodes are connected via a bus where cache memories are not directly connected, it is possible to reduce an amount of processing necessary for data maintenance in the cache memory.

The present invention is not limited to the above embodiments and various changes and modifications can be made within the spirit and scope of the present invention. Therefore, to appraise the public of the scope of the present invention, the following claims are made.

What is claimed is:

1. A data processing system where a plurality of nodes are connected via a network, each node having a plurality of processors and respective cache memories associated with each of the processors, comprising:

administration means for administrating attribute information to each data block stored in each cache memory in each node to indicate whether or not the data block is cached in another cache memory in the node and whether or not the data block is cached in another cache memory in another node;

first maintenance means for, in a case where an access requiring cache maintenance is issued to a cached data block in a cache memory and attribute information of the data block subjected to the access indicates that the data block is cached in another cache memory in the node, executing cache maintenance with respect to cache data in the node in which the access has issued; and second maintenance means for, in a case where an access requiring cache maintenance is issued to a cached data block in a cache memory and attribute information of the data block subjected to the access indicates that the data block is cached in another cache memory in another node, executing cache maintenance with respect to cache data in said another node.

2. The data processing system according to claim 1, wherein the cache maintenance executed by said first maintenance means and said second maintenance means is the processing for maintaining coherency among a plurality of cache memories for the data block subjected to the access.

3. The data processing system according to claim 2, wherein said access is an access for rewriting contents of the data block.

4. The data processing system according to claim 1, wherein said second maintenance means comprises:

requesting means for, in a case where the attribute information of the data block, subjected to the access, indicates that the data block is cached in another node, issuing an invalidate request of the data block to said another node; and invalidating means for, upon receiving the invalidate request, invalidating the data block which is designated to invalidate.

5. The data processing system according to claim 1, wherein said adding means comprises:

obtaining means for, in a case where a cache miss occurs at the time of accessing a cache memory, obtaining a corresponding data block;

detecting means for detecting a caching state of the data block; and generating means for generating attribute information related to the data block on the basis of the caching state detected by said detecting means.

6. The data processing system according to claim 5, wherein the attribute information indicates any one of: whether or not the corresponding data block is in an invalid state; whether or not the data block has the same contents as that of an original of the data block and is in an exclusive state; whether or not the data block has different contents from that of the original and is in an exclusive state; whether or not the data block is in a shared caching state being shared with a plurality of nodes; or whether or not the data block is in a shared caching state being shared only within the same node.

7. The data processing system according to claim 1, further comprising:

determining means for, in a case where a data block stored in a cache memory is cached in another cache memory, determining whether the data block is cached in another node or in the same node; and updating means for updating the attribute information based on the result of determination of said determining means.

8. A data processing system where a plurality of nodes are connected via a network, each node having a plurality of processors and respective cache memories associated with each of the processors, comprising:

adding means for adding attribute information to each data block stored in the cache memories to indicate whether or not the data block is cached in another node;

first maintenance means for, in a case where an access requiring cache maintenance is issued to a cached data block, executing cache maintenance with respect to cache data in a node issuing the access; and second maintenance means for, in a case where attribute information of the data block subjected to the access indicates that the data block is cached in another node, executing cache maintenance with respect to cache data in said another node, wherein said first maintenance means executes cache maintenance according to the snoop method and said second maintenance means executes cache maintenance according to the directory based method.

9. A data processing system where a plurality of nodes are connected via a network, each node having a plurality of processors and respective cache memories associated with each of the processors, comprising:

adding means for adding attribute information to each data block stored in the cache memories to indicate whether or not the data block is cached in another node;

first maintenance means for, in a case where an access requiring cache maintenance is issued to a cached data block, executing cache maintenance with respect to cache data in a node issuing the access;

second maintenance means for, in a case where attribute information of the data block subjected to the access indicates that the data block is cached in another node, executing cache maintenance with respect to cache data in said another node;

determining means for, in a case where a data block stored in a cache memory is cached in another cache memory, determining whether the data block is cached in another node or in the same node; and updating means for updating the attribute information based on the result of determination of said determining means, wherein, in a case where the data block, having attribute information indicating that the data block has the same contents as that of the original of the data block and is in an exclusive state, is cached within the same node, said updating means updates the attribute information of the data block into a shared caching state only within the same node, and in a case where the data block is cached in another node, said updating means updates the attribute information into a shared caching state in a plurality of nodes.

10. A data processing apparatus, having a plurality of processors and respective cache memories associated with each of the processors, communicable with another data processing apparatus, comprising:

administration means for administrating attribute information to each data block stored in each cache memory to indicate whether or not the data block is cached in another cache memory in the apparatus and whether or not the data block is cached in another cache memory in another data processing apparatus;

first maintenance means for, in a case where an access requiring cache maintenance is issued to a cached data block in a cache memory and attribute information of the data block subjected to the access indicates that the data block is cached in another cache memory in the apparatus, executing cache maintenance with respect to the data block in the apparatus; and second maintenance means for, in a case where an access requiring cache maintenance is issued to a cached data block in a cache memory and attribute information of the data block subjected to the access indicates that the data block is cached in another data processing apparatus, issuing a cache maintenance request to said another data processing apparatus.

11. The data processing apparatus according to claim 10, wherein the cache maintenance, executed and requested by said first maintenance means and said second maintenance means, is the processing for maintaining coherency among a plurality of cache memories for the data block subjected to the access.

12. The data processing apparatus according to claim 11, wherein said access is an access for rewriting contents of the data block.

13. The data processing apparatus according to claim 10, wherein said second maintenance means comprises:

requesting means for, in a case where the attribute information of the data block subjected to the access indicates that the data block is cached in another data processing apparatus, issuing an invalidate request of the data block to said another data processing apparatus; and invalidating means for, upon receiving the invalidate request, invalidating the data block which is designated to invalidate.

14. A data processing apparatus, having a plurality of processors and respective cache memories associated with each of the processors, communicable with another data processing apparatus, comprising:

adding means for adding attribute information to each data block stored in the cache memories to indicate whether or not the data block is cached in another data processing apparatus;

first maintenance means for, in a case where an access requiring cache maintenance is issued to a cached data block, executing cache maintenance with respect to the data block; and second maintenance means for, in a case where attribute information of the data block subjected to the access indicates that the data block is cached in another data processing apparatus, issuing a cache maintenance request to said another data processing apparatus, wherein said first maintenance means executes cache maintenance according to the snoop method and said second maintenance means executes cache maintenance according to the directory based method.

15. The data processing apparatus according to claim 10, wherein said adding means comprises:

obtaining means for, in a case where a cache miss occurs at the time of accessing a cache memory, obtaining a corresponding data block;

detecting means for detecting a caching state of the data block; and generating means for generating attribute information related to the data block on the basis of the caching state detected by said detecting means.

16. The data processing apparatus according to claim 15, wherein the attribute information indicates any one of: whether or not the corresponding data block is in an invalid state; whether or not the data block has the same contents as that of an original of the data block and is in an exclusive state; whether or not the data block has different contents from that of the original and is in an exclusive state; whether or not the data block is in a shared caching state being shared with a plurality of nodes; or whether or not the data block is in a shared caching state being shared only within the same node.

17. The data processing apparatus according to claim 10, further comprising:

determining means for, in a case where a data block stored in a cache memory is cached in another cache memory, determining whether the data block is cached in another node or in the same node; and updating means for updating the attribute information based on the result of determination of said determining means.

18. A data processing apparatus, having a plurality of processors and respective cache memories associated with each of the processors, communicable with another data processing apparatus, comprising:

adding means for adding attribute information to each data block stored in the cache memories to indicate whether or not the data block is cached in another data processing apparatus;

first maintenance means for, in a case where an access requiring cache maintenance is issued to a cached data block, executing cache maintenance with respect to the data block;

second maintenance means for, in a case where attribute information of the data block subjected to the access indicates that the data block is cached in another data processing apparatus, issuing a cache maintenance request to said another data processing apparatus; and third maintenance means for, in a case where the cache maintenance request is transferred from another data processing apparatus, executing cache maintenance according to the request.

19. A data processing apparatus, having a plurality of processors and respective cache memories associated with each of the processors, communicable with another data processing apparatus, comprising:

adding means for adding attribute information to each data block stored in the cache memories to indicate whether or not the data block is cached in another data processing apparatus;

first maintenance means for, in a case where an access requiring cache maintenance is issued to a cached data block, executing cache maintenance with respect to the data block;

second maintenance means for, in a case where attribute information of the data block subjected to the access indicates that the data block is cached in another data processing apparatus, issuing a cache maintenance request to said another data processing apparatus;

determining means for, in a case where a data block stored in a cache memory is cached in another cache memory, determining whether the data block is cached in another node or in the same node; and updating means for updating the attribute information based on the result of determination of said determining means, wherein, in a case where the data block, having attribute information indicating that the data block has the same contents as that of the original of the data block and is in an exclusive state, is cached within the same node, said updating means updates the attribute information of the data block into a shared caching state only within the same node, and in a case where the data block is cached in another node, said updating means updates the attribute information into a shared caching state in a plurality of nodes.

20. A method of cache maintenance in a data processing system where a plurality of nodes are connected via a network, each node having a plurality of processors and respective cache memories associated with each of the processors, comprising:

an administration step of administrating attribute information to each data block stored in each cache memory to indicate whether or not the data block is cached in another cache memory in the node and whether or not the data block is cached in another cache memory in another node;

a first maintenance step of, in a case where an access requiring cache maintenance is issued to a cached data block in a cache memory and attribute information of the data block subjected to the access indicates that the data block is cached in another cache memory in the node, executing cache maintenance with respect to cache data in a node issuing the access; and a second maintenance step of, in a case where an access requiring cache maintenance is issued to a cached data block in a cache memory and attribute information of the data block subjected to the access indicates that the data block is cached in another cache memory in another node, executing cache maintenance with respect to a data block in said another node.

21. A method of cache maintenance in a data processing apparatus, having a plurality of processors and respective cache memories associated with each of the processors, communicable with another data processing apparatus, comprising:

an administration step of administrating attribute information to each data block stored in each cache memory to indicate whether or not the data block is cached in another cache memory in the apparatus and whether or not the data block is cached in another cache memory in another data processing apparatus;

a first maintenance step of, in a case where an access requiring cache maintenance is issued to a cached data block in a cache memory and attribute information of the data block subjected to the access indicates that the data block is cached in another cache memory in the apparatus, executing cache maintenance with respect to the data block in the apparatus; and a second maintenance step of, in a case where an access requiring cache maintenance is issued to a cached data block in a cache memory and attribute information of the data block subjected to the access indicates that the data block is cached in another cache memory in another data processing apparatus, issuing a cache maintenance request with respect to the data block in said another data processing apparatus.

22. A method of cache maintenance in a data processing apparatus, having a plurality of processors and respective cache memories associated with each of the processors, communicable with another data processing apparatus, comprising:

an adding step of adding attribute information to each data block stored in the cache memories to indicate whether or not the data block is cached in another data processing apparatus;

a first maintenance step of, in a case where an access requiring cache maintenance is issued to a cached data block, executing cache maintenance with respect to the data block;

a second maintenance step of, in a case where attribute information of the data block subjected to the access indicates that the data block is cached in another data processing apparatus, issuing a cache maintenance request with respect to in said another data processing apparatus; and a third maintenance step of, in a case where the cache maintenance request is transferred from another data processing apparatus, executing cache maintenance according to the request.

23. A computer-readable memory storing a program for cache maintenance control in a data processing apparatus, having a plurality of processors and respective cache memories associated with each of the processors, communicable with another data processing apparatus, said program comprising:

program codes for an administration step of administrating attribute information to each data block stored in each cache memory to indicate whether or not the data block is cached in another cache memory in the apparatus and whether or not the data block is cached in another cache memory in another data processing apparatus;

program codes for a first maintenance step of, in a case where an access requiring cache maintenance is issued to a cached data block in a cache memory and attribute information of the data block subjected to the access indicates that the data block is cached in another cache memory in the apparatus, executing cache maintenance with respect to the data block in the apparatus; and program codes for a second maintenance step of, in a case where an access requiring cache maintenance is issued to a cached data block in a cache memory and attribute information of the data block subjected to the access indicates that the data block is cached in another data processing apparatus, issuing a cache maintenance request to said another data processing apparatus.

24. A computer-readable memory storing a program for cache maintenance control in a data processing apparatus, having a plurality of processors and respective cache memories associated with each of the processors, communicable with another data processing apparatus, said program comprising:

program codes for an adding step of adding attribute information to each data block stored in the cache memories to indicate whether or not the data block is cached in another data processing apparatus;

program codes for a first maintenance step of, in a case where an access requiring cache maintenance is issued to a cached data block, executing cache maintenance with respect to the data block;

program codes for a second maintenance step of, in a case where attribute information of the data block subjected to the access indicates that the data block is cached in another data processing apparatus, issuing a cache maintenance request to said another data processing apparatus; and program codes for a third maintenance step of, in a case where the cache maintenance request is transferred from another data processing apparatus, executing cache maintenance according to the request.

* * * * *